(No Model.)

F. M. CLARK.
OPTICAL INSTRUMENT.

No. 579,132. Patented Mar. 23, 1897.

WITNESSES.
Matthew M. Blunt.
C. M. Wilbur.

INVENTOR
Frank M. Clark,
By P. M. Shaw,
ATT'Y.

THE NORRIS PETERS CO., PHOTO-LITHO., WASHINGTON, D. C.

UNITED STATES PATENT OFFICE.

FRANK M. CLARK, OF TILTON, NEW HAMPSHIRE.

OPTICAL INSTRUMENT.

SPECIFICATION forming part of Letters Patent No. 579,132, dated March 23, 1897.

Application filed August 14, 1896. Serial No. 602,744. (No model.)

*To all whom it may concern:*

Be it known that I, FRANK M. CLARK, of Tilton, in the county of Belknap, State of New Hampshire, have made certain new and useful Improvements in Optical Instruments, of which the following is a description sufficiently full, clear, and exact to enable any person skilled in the art or science to which said invention appertains to make and use the same, reference being had to the accompanying drawings, forming part of this specification, in which—

Figures 1, 2:
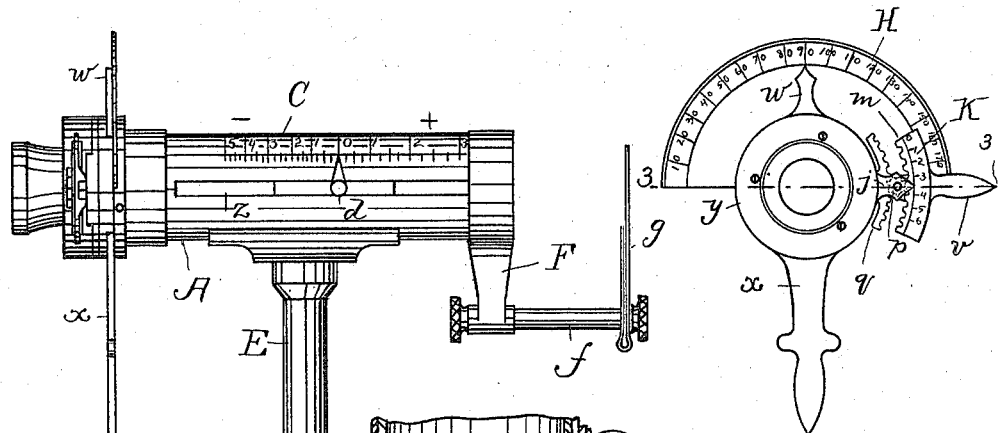
Figure 3:
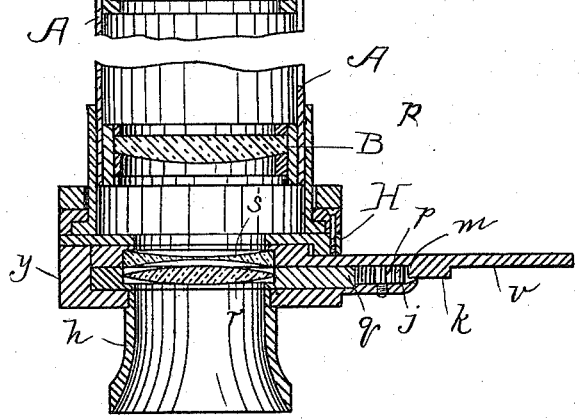

Figure 1 is a side elevation of my improved adjustable trial-case; Fig. 2, a horizontal section of the same, and Fig. 3 an end elevation.

Like letters of reference indicate corresponding parts in the different figures of the drawings.

My invention relates to a trial-case or that class of optical instruments sometimes known as "autophoro-optimeter," and is employed for testing the human eye for the purpose of correcting inequalities in sight, as astigmatism, myopia, hypermetropia, and muscular difficulties, whereby the proper dimensions of lenses may be ascertained which will remedy such defects, the object being especially to produce a mechanism by means of which these data may be quickly and easily obtained even by inexperienced persons and without subjecting the patient to prolonged and tedious tests, which ordinarily result in so tiring the muscles of the eye of the patient that the oculist is frequently misled and prescribes the wrong combination of lenses. My invention overcomes these and other objections, and in carrying it out I make use of means which will be readily understood by those conversant with such matters from the following explanation:

In the drawings, A represents a metallic cylinder mounted on a standard E and comprising the body of the instrument. In one end of this cylinder there is a fixed plano-convex lens B, and mounted to slide in said cylinder there is a double-concave lens D, this arrangement being the opposite of that in the ordinary telescope or "field-glass." On the mounting of the lens D there is an index $d$, which slides in a slot $z$ in the cylinder, and on said cylinder there is a scale C, increasing from a determined central or zero point toward both ends of said cylinder, respectively.

On the outer end of the cylinder there is a bracket F, in which is an adjustable rod $f$, carrying a rack $g$ for holding the "sight-card," which is imprinted with the radiating groups of parallel lines in the ordinary manner as employed for this purpose.

The lens D is employed for ascertaining the power of the spherical lens required to correct the sight and is expressed in either inches or dioptrics on the scale C.

The forward end of the cylinder is provided with an eyepiece $h$, and between it and the fixed lens B two lenses $r s$ are mounted to rotate in suitable bearings. The lens $r$ is a cylindrical convex, and the lens $s$ is a cylindrical concave, arranged with their axes normally coinciding.

Fast on the cylinder is a segment-scale H, spaced in degrees and forming the axis-scale, the numbers thereon being the same as the numbers of the line-groups on the sight-card.

A rotary casing $y$ incloses the bearings of the lenses $r s$ and has an index $w$ for the scale H, a handle $x$ for operating it, and a radially-projecting index $j$.

On the bearing of the lens $r$ there is a segment-rack $q$, which meshes with a pinion $p$, journaled on the index $j$ of the casing. On the bearing of the companion lens $s$ there is a scale K, spaced to indicate in dioptrics the power of the cylindrical lens required and provided with a handle. This scale has a segment-rack $m$, coaxial with the rack $q$ and meshed with the pinion $p$, and said index being fast on the casing $y$ and carrying the pinion $p$, meshed with racks on the bearings of both lenses $r s$. When the casing is rotated, the relative position of said lenses is not changed and their axes remain coincident. The index $j$ overlaps the scale K.

In use when the index $j$ points to zero on the cylinder-scale K the axes of the lenses $r s$ are parallel and neutral. The operator now moves the lens D until at such point as the patient sees the lines on the sight-card the best, it being understood that changing the position of the concave lens D in relation to the convex lens B magnifies or diminutes, as the case may be, in the ordinary manner of telescopes. This will indicate in dioptrics, either plus or minus, on the scale C, the power of the spherical in the lens needed. The operator is now informed by the patient which of the lines on the sight-card he can see the most distinctly, and the casing $y$ is then rotated until the index $w$ points to the numeral on the scale H which is the same as the number of said group of lines. The lenses $r$ $s$, being carried conjointly by the casing without disturbing their relative positions and their axes being still parallel and neutral, are now by this movement disposed at right angles to the group-lines on the sight-card whose number has been indicated. Said number determines the axis of the lens needed. By means of the handle $x$ this index is held at this point, fixing the axes of the lenses $r$ $s$ correspondingly. The segment-scale K is then moved in either direction, thereby rotating the lenses $r$ $s$, respectively, in opposite directions by means of the connecting-gears until the patient sees all of the lines on the sight-card with equal distinctness. The number indicated by the pointer $j$ on the scale K will give the cylindrical power in dioptrics of the lens needed. This power is the most difficult by the methods usually employed to ascertain. By the use of my device it will be seen that while the axis is maintained the cylinder can be found very quickly and without tiring the eye-muscles of the patient. Moreover, this method is much more accurate than that usually employed, as the lenses do not have to be continually changed by the operator to get the cylindrical power, each change ordinarily resulting in misplacement of the axis.

It will be seen, therefore, that a salient feature of my invention comprises means for quickly adjusting the cylindrical lenses by rotation without substitution while maintaining the proper position of the axes of said lenses.

Having thus explained my invention, what I claim is—

1. In an instrument of the character specified two cylindrical lenses; mechanism for conjointly rotating said lenses in like direction to establish the axial line, and mechanism for rotating said lenses in opposite directions respectively, to ascertain the cylindrical power.

2. In an instrument for testing human eyesight a concave and a convex cylindrical lens having their axes normally in parallelism; and mechanism for rotating said lenses respectively in opposite directions simultaneously substantially as and for the purpose specified.

3. In an instrument of the class described two cylindrical lenses having their axes normally parallel; devices for rotating said lenses conjointly in one direction; an axis-scale; an index carried by said devices; mechanism for rotating said lenses respectively in opposite directions while the position of said index is sustained; and a scale for determining the rotation in opposition of said lenses substantially as set forth.

FRANK M. CLARK.

Witnesses:
CHARLES L. HUNT,
FRANKLIN N. CHASE.